July 4, 1972  G. HANSEN  3,674,405
APPARATUS FOR PRODUCING, FILLING AND CLOSING PLASTIC CONTAINERS
Filed May 7, 1970

INVENTOR.
Gerhard Hansen
BY
Watson, Cole, Grindle & Watson
Attys.

United States Patent Office 3,674,405
Patented July 4, 1972

3,674,405
APPARATUS FOR PRODUCING, FILLING AND CLOSING PLASTIC CONTAINERS
Gerhard Hansen, 47 Hofener Strasse, D7013 Oeffingen, Germany
Filed May 7, 1970, Ser. No. 35,439
Claims priority, application Germany, May 7, 1969, P 19 23 236.1
Int. Cl. B29d 23/03; B29f 1/14
U.S. Cl. 425—308                                        4 Claims

ABSTRACT OF THE DISCLOSURE

Apparatus for producing, filling and closing plastic containers in which the container is molded between two lower mold halves and two upper mold halves arranged above the lower mold halves so that the upper mold halves will mold the head of the container.

---

Figure 1:
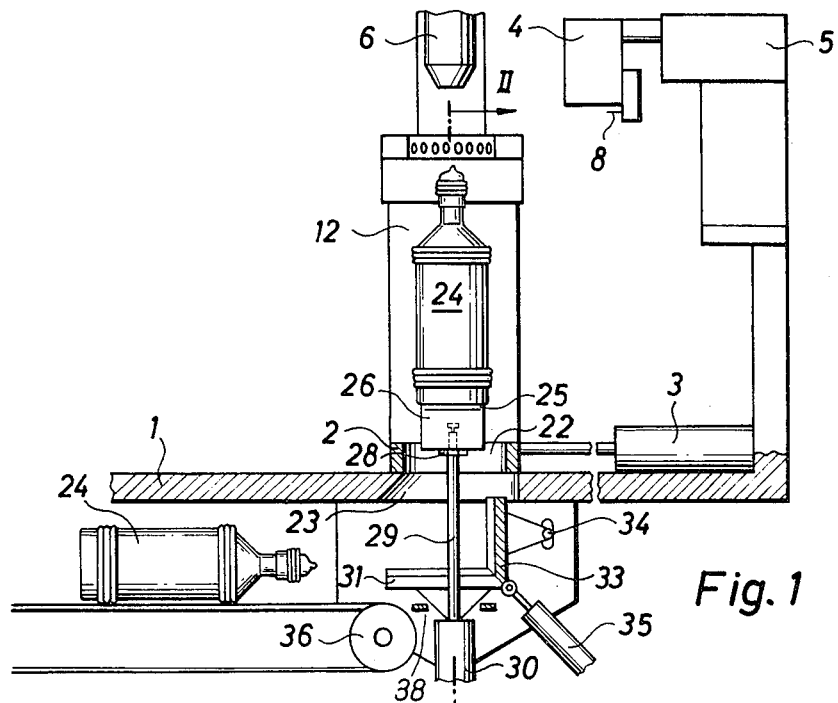

The invention relates to an apparatus for the production, filling and closing of a container of thermoplastic synthetic material, more particularly of polyethylene, including a device for moulding the container, which has two lower mould-halves for the moulding of the belly and base of the container as well as upper-mould-halves arranged above the lower mould halves and displaceable independently therefrom to mould the head of the container.

In a known apparatus, on opening of the mould, the molded containers are designed to fall onto a conveyor arranged therebelow so that, with small sized containers, they are easily removable without damage as they fall onto the conveyor. It is however a different matter with large containers, in which the ratio of the wall thickness to the container diameter is considerably less than in smaller containers.

In another known apparatus, the container formed and filled in the production mould is deposited, on opening of the mould, onto a support plate adapted to be raised and lowered and, during the process of lowering, the head part to be attached is pressed out from the extruder so that, on closure of the production mould for the moulding and filling of the following container, the head is closed. In such case the container is not supported during the removal of the container, because only after removal can the container be placed on the support plate.

After being pressed out from the extruder, the container must sink correspondingly and has to be held for the closure of the head of the container, before the latter can be removed from the support plate, which results in a great loss of time.

Containers have also been produced by means of a split mould with the filling thereof taking place in a subsequent work stage, the container being supported by means of a separate support mould, which moves at the same speed as the pieces of tube pressed out from the extruder and serving for the production of the container. The support mould serves at the same time for the closure of the filled container. The container is passed from the support mould to a conveyor. The known apparatus however operates quite slowly because the container produced in the first work stage can only be removed from the mould and filled on attainment of sufficient strength. As the closure of the container only takes place very late, the danger exists that the closure is not free from faults.

The object of the invention is the saving of the time of production from the removal of the container from the production mould up to its delivery onto a conveyor. The container is produced from a piece of extruded tube, is filled and closed while it is still located in the production mould. Since the container has not at that point reached its final stiffness, difficulties arise, particularly with large containers, on removal and placing on a conveyor, if the stiffening of the whole container does not have to be awaited. By holding the filled container at its head and by supporting its base, if necessary by raising it slightly, the removal is facilitated and the container is placed gently onto the support plate by the supporting action of the support member. In this way a free fall is obviated. Due to the engagement of the support member in a butt on the container, the support of the container is possible even when this is not completely removed from the production mould and free fall from the mould onto the support member is prevented. Furthermore, the placing of the container onto the support plate is made easier. By means of the invention and particularly in the case of large containers, a considerable shortening of the time for removal of the container from the production mould up to its placing on a conveyor is obtained.

In accordance with the invention, the lower half of the form has a recess, for engagement of the support member when the mould is closed, at a distance from the part provided for the moulding of the base of the container. The support member can thus be passed close to the base of the container. The region of the butt lying between the base of the container and the support member has a strangulation point for easy removal from container.

The support member may with advantage save to remove the butt if it has a shape passing with a form locking connection with the butt at its end engaging the butt, for example, an annular groove, a barb or the like, the butt is thus taken along by the support member after the container rests on the support plate and breaks at its strangulation point.

The invention further provides that the support plate is designed to tip and in the tipped state forms an inclined plane leading to a conveyor. The rapid tilting of the filled container after its construction produces a rapid cooling of the head of the container by the material contained therein whereby its shape is stabilized and the danger of damage to parts which are still soft is prevented. Furthermore, a safe guiding of the container to the conveyor is obtained by means of the support plate. The support plate does not need to be immediately below the production mould or in the region of the support member, but may also be arranged laterally offset with respect thereto.

Figure 2:
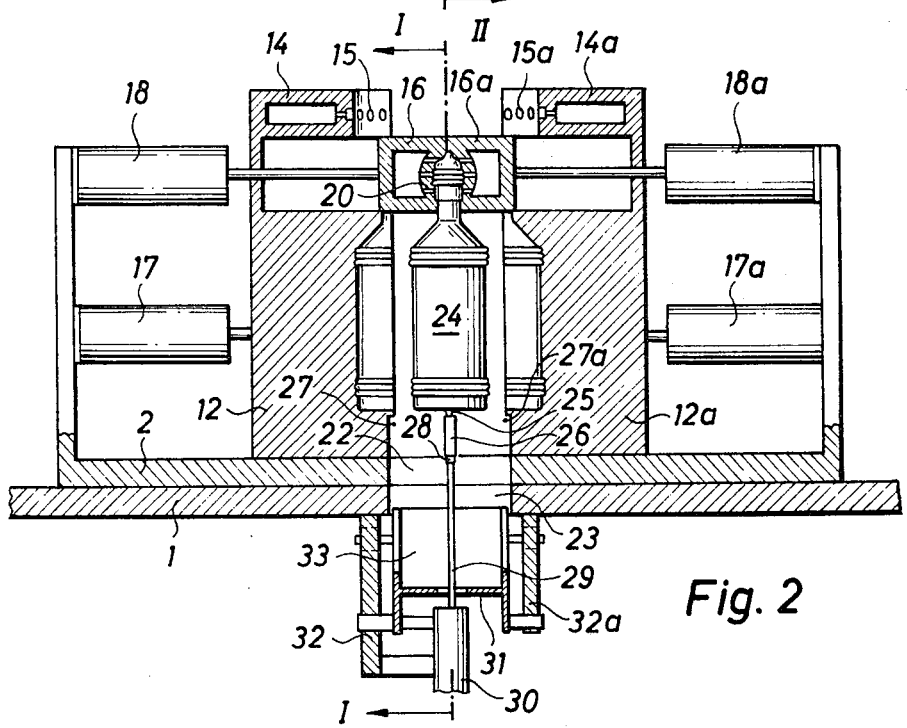

An embodiment of the invention is shown schematically in the accompanying drawings, by way of example only, and in which:

FIG. 1 is a section along line I—I in FIG. 2.
FIG. 2 is a section along line II—II in FIG. 1.

A carriage 2 is adapted to be displaced on a table 1 by means of a work cylinder 3 operable hydraulically or pneumatically from a position below the mouth piece 4 of an extruder press 5, to a position below a feed and filling device 6 mounted on the table and adapted to be raised and lowered. The extruder press serves for the production of a plastic tube of polyethylene or the like and has a separating knife 8 at its mouth piece 4. Pipes (not shown) connected respectively to a source of compressed air or to a reservoir of the material with which the container is to be filled, are attached to the filling device 6.

The carriage 2 connects two lower half moulds 12 and 12a adapted to displace transversely to the direction of displacement of the piston of the work cylinder 3. On each of these halves a holder 14 and 14a respectively, adapted to be placed under vacuum is provided for the tube separated by the knife 8 from the mouth piece 4, the holders having suction jets 15, 15a respectively. An upper half mould 16, or 16a is located between the holder 14 or 14a and the lower half moulds 12 or 12a, adapted to be displaced parallel to the related under half mould, and the two halves facilitate production of the head for the container between them.

The lower half mould 12 or 12a is adapted to be displaced on the carriage by means of a hydraulic or pneumatic work cylinder 17 or 17a and the upper half mould 16 or 16a by means of a hydraulic or pnuematic work cylinder 18 or 18a, to be displaced on the lower half mould 12 or 12a respectively. The lower half mould 12 or 12a is provided on its upper inner side, together with a filling mould of the filling device 6 on its outer side, with a heat insulating liner. The upper half mould 16 or 16a is connected, in the same way as the holder 14 or 14a, to a source of suction (not shown) and likewise has suction jets 20.

The carriage 2 has an opening 22 and the table 1 has an opening 23 for the passage of a filled container 24.

A butt 26 is provided on the lower end of the container 24 and has a strangulation point 25 offset against the same, which is formed by a recess 27 or 27a on the lower half mould 12 or 12a respectively.

A support member 28 has a cut-out, a barb or the like, to make a form-locking connection with the butt 26 and grips onto the latter. The support member 28 is mounted on the piston rod 29 of a work cylinder 30 secured below the table 1.

A two-part support plate 31 is located below the openings 22 and 23, and is adapted to pivot in block bearings 32 and 32a arranged below the table, and is connected to a one piece side plate 33 which is adapted to pivot and, in a certain range, displace in elongated openings provided in the bearing blocks 32 and 32a. A hydraulic or pneumatic work cylinder 35 serves to operate the support plate 31 and the side plate 33 and which are each provided with a rim on each side. A conveyor device 36, in the form of a belt conveyor, is arranged at the side of the support plate 31 remote from the side plate 33.

A butt-stripper 38, for example, in the form of a stop for the lower outer side of the butt 26, is provided between the support plate 31 and the work cylinder 30. If several barbs or the like are mounted on the support member 28, these are preferably connected to one another below the stripper which then engages between them.

A piece of tube is pressed out of the mouth 4 of the extruder press. As soon as this piece has reached a sufficient length the two lower half moulds 12 and 12a travel together below the mouth piece 4 to reecive the piece of tube 7 between them. Accordingly the piece of tube is closed at its base and the butt 26 formed. The piece of tube is held at its upper end by the holders 14, 14a and separated from the mouth piece 4 by the knife 8.

The upper half mould 16 or 16a can be moved along with the lower half mould 12 or 12a on movement of the latter, without however being brought into a closed position.

The production mould closed by its lower half moulds 12, 12a travels to a position below the filling device 6, whose mandrel is lowered onto the lower half moulds 12, 12a and dips into the piece of tube. The mandrel rests on the lower half moulds, the piece of tube lying therebetween, for which purpose the lower end of the mandrel and the upper end of the lower half moulds are conically designed and are provided with a heat insulating liner to prevent loss of heat. Compressed air is blown in the filling mandrel and held at a given pressure so that the piece of tube can inflate and rest itself against the walls of the lower half moulds 12, 12a. The piece of tube could be inflated not only by inner excess pressure, but also by vacuum acting from the outside. Filler material is subsequently delivered into the container if necessary with displacement of compressed air.

Thereafter the upper half moulds 16, 16a are moved toward one another for the formation of the head of the container by employment of a vacuum acting through the jets 20. To remove the filled and closed containers from the mould the lower half moulds 12, 12a are moved away from one another, as shown in FIG. 2, the upper half moulds 16, 16a remaining closed to hold the container, which is also supported by the support member 28 gripping into the butt 26. This can be raised to assist the process of removal. Shortly before the commencement of the lowering process of the support member 28, the upper half moulds 16, 16a are moved apart and release the head of the container 24. The container is then placed on the support plate 31, the butt 26 being separated from the container 24 at its strangulation point 25 as the piston rod 29 continues to move outwardly of the support plate, and being stripped off from the support member 28 as the butt bears against stop 38 during continued lowering of the piston rod.

By operation of the work cylinder 35, the support plate 31 and the side plate 33 are brought into their pivotal position and form an inclined plane so that the container 24 may be placed on the conveyor device 36 in the tilted state to be carried away thereon. The material present in the container 24 serves at this time to cool down the head of the container on its inside so that its cooled outer side can no longer be returned to a plastic state by the amount of heat stored on the inside.

After removal of the container from the production mould, 12, 12a, 16, 16a, the production mould again travels below the mouth piece 4 of the extruder press 5 for the reception of a fresh piece 7 of plastics tube. The prior described working cycle is then repeated.

The movements of the upper and lower half moulds 12, 12a and 16, 16a the blowing in of compressed air, the filling with material, the requisite lifting and lowering movements of the filling device 6, the operating of work cylinders 30 and 35 and if desired the exit of the tube 7 from the mouth piece 4 of the extruder press 5 are controlled by means of end stops, time relays and like switch means so that the various stages for the production of containers proceed automatically.

The apparatus according to the invention is particularly suitable for large and heavy containers and lessens to an appreciable extent the difficulties of removal of the container from the mould. Any prefall of the container is prevented as well as damage to the relatively thin wall of the container. Also a rapid cooling of all parts of the container is provided so that the individual stages in the production of a container can follow one another in rapid succession. The support member serves in an advantageous manner for the removal of the butt. The butt can be easily stripped by the support member and without great expense.

The support plate 31 together with the side plate 33 and the work cylinder 35 may also be arranged laterally offset to the work cylinder 30 by interposition of an intermdiate conveyor.

What I claim is:

1. An apparatus for the production, filling and closing of a container made of a synthetic material, particularly polyethylene, including a device for molding the container comprising two mold halves movable toward one another for molding the container therebetween, the inner surface of each said mold halves having a recess therein located below the mold base for the container to be formed, said recesses forming a butt of the material on the container base upon its being formed, a support member disposed below said mold halves for movement toward and away therefrom, said support member having a peripheral surface irregularity at one end thereof, said support member one end being imbedded within and thereby connected with the butt of material at the time the container is being formed, a support plate disposed below said support member, means for moving said support member toward and away from said mold halves whereby the container may be moved, after being so formed, downwardly of said mold halves by means of the interconnection between said support member one end and the butt material on the container base, and a stop means being disposed below said support plate whereby downward movement of said support member below said stop means serves to strip the butt material from said support member as the butt material engages said stop means.

2. The apparatus according to claim 1 wherein said support plate is provided with an opening therein to accommodate movement of the butt material therethrough during the lowering of said support member, said support plate thereby serving to strip the butt material from the container as the container base engages with said support plate.

3. The apparatus according to claim 1 further including a conveyor means for the container, and a means for tilting said support plate toward said conveyor means.

4. The apparatus according to claim 3 wherein a side plate is secured to said support plate, and a means operatively engaging one of said plates for tilting said support plate.

References Cited
UNITED STATES PATENTS

| | | | |
|---|---|---|---|
| 3,417,428 | 12/1968 | Rupert | 18—5 BS |
| 3,533,132 | 10/1970 | Rupert et al. | 18—5 BM |
| 3,325,860 | 6/1967 | Hansen | 18—5 BF |

J. SPENCER OVERHOLSER, Primary Examiner

M. O. SUTTON, Assistant Examiner

U.S. Cl. X.R.

83—914; 425—306, 317, 326, 455